United States Patent Office 2,978,432
Patented Apr. 4, 1961

2,978,432

PROCESS FOR PRODUCING POLYMERS AND CO-POLYMERS CONTAINING METHYLOLETHER GROUPS

Wilhelm Graulich and Karl E. Müller, Leverkusen-Bayerwerk, Germany, assignors to Farbenfabriken Bayer Aktiengesellschaft, Leverkusen, Germany, a corporation of Germany No Drawing. Filed June 30, 1955, Ser. No. 519,241

Claims priority, application Germany July 23, 1954

7 Claims. (Cl. 260—45)

The present invention relates to a process of producing polymers and copolymers from methylol methyl ethers of acryl amide or methacryl amide or similar compounds and further concerns the novel polymers and copolymers thus obtained.

More specific object will become apparent as the following description proceeds.

In accordance with the present invention it has been found that polymerizable, organic compounds containing the grouping

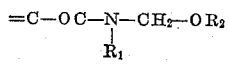

once or several times in the molecule—in the above formula $R_1$ stands for hydrogen, alkyl, preferably methyl, and $R_2$ for alkyl, preferably with 1–4 carbon atoms—can be polymerized in block, solution or emulsion, either as such or in mixture with one or more organic compounds containing one or more polymerizable double bonds, without cross-linking of the resultant polymers or copolymers being effected by the methylol ether groups of the said compounds. For this purpose, the polymerization or copolymerization process is preferably carried out at the lowest possible temperatures, which do not exceed 60° C., in a neutral or weakly alkaline medium.

Compounds containing methylol ether groups, which are suitable according to the invention, are e.g. the alkyl ethers of the methylol compounds of acrylamide, methacrylamide, sorbic acid amide, the diamides of muconic acid and fumaric acid as well as the alkyl ethers of the methylol compounds of unsaturated urethanes, such as those of allyl urethane and unsaturated ureas. The term "alkyl ethers" as herein used is intended to include both alkyl and isoalkyl derivatives. Of these compounds the alkyl, preferably the methyl ethers of the methylol compounds of acrylamide and methacrylamide have been found to be especially valuable.

The aforesaid alkyl ethers are obtainable by etherifying the methylol compounds of unsaturated carboxylic acid amides, ureas or urethanes with an alcohol in an acid medium according to the process of the copending application concurrently filed herewith in the name of Muller and Holtschmidt under the title "Process for the production of unsaturated methylol ethers," which application will be assigned to the same assignee as this application. This application is the one filed June 29, 1955 under Serial No. 518,954.

On principle, all organic compounds containing one or more polymerizable double bonds are suitable according to the invention to produce the herein described copolymers. As examples may be mentioned butadiene, its homologues and derivatives, styrene and its polymerizable substitution products, acrylonitrile, methacrylonitrile, acrylates and methacrylates, acrylic acid amides, methacrylic acid amides, vinyl chloride, vinylidene chloride and organic vinyl esters. Copolymers with particularly valuable properties are obtained if the methylol ethers are used in lower quantities than the other components. Therefore, the methylol ether compounds are preferably applied in quantities of about 0.5 to about 30 mol percent calculated on the amount of the other components used in the copolymerization process.

The alkyl ethers of the methylol compounds of acrylamide and methacrylamide are preferably polymerized in aqueous solution or copolymerized with water-soluble polymerizable compounds. It is a surprising feature of the invention that the aforesaid compounds, especially the methylol alkyl ethers of methacrylamide are incorporated despite their good water solubility in copolymers which are produced by conventional methods in aqueous emulsion with water-insoluble, organic polymerizable compounds.

The method for determination of the standard Fikentscher K-values is found in Fikentscher, Cellulose Chemie, 13, page 60 (1932).

The polymerization process of the invention can be accelerated by addition of the known substances forming radicals e.g. peroxides, peracids and salts thereof; it is of advantage to apply the known redox systems to maintain the polymerization temperature low thus avoiding premature cleavage and condensation reaction of the methylol ether group. The height of the molecular weight and the length of the chains of the polymers obtained can be varied by means known per se such as by addition of regulating substances (see W. Graulich and W. Becker, Zeitschrift fur makromol. Chemie 3 (1949) pages 53–771), or by varying the amount of the activator used and the reaction temperature.

The polymers and copolymers obtained according to the invention carry reactive methylol ether groups. These reactive methylol ether groups can be split up under the influence of alcoholizing agents, e.g. organic and inorganic acids, such as mineral acids, phosphoric acid, acetic acid, trichloracetic acid, p-toluolene-sulfonic acid, if desired at elevated temperature of about 100–200° C. These acids are preferably applied in such quantities, that the pH-value of the reaction mixture is less than 5, preferably 1–4. It is furthermore possible to split up the methylol ether groups by heating the polymerizates and copolymerizates to temperatures of about 100–200° C. preferably 120-150° C. for a few minutes. When proceeding in this manner, spontaneous cross-linking of the polymers and the copolymers takes place concurrently. The herein described polymers and copolymers can also be reacted with polyfunctional compounds which react with methylol ethers or the reaction products thereof produced by the action of alcoholizing agents, such as, for example, water soluble condensates of phenols, ureas, dicyandiamides or sulfonamides and aldehydes, especially formaldehyde. These polyfunctional compounds are preferably applied in quantities amounting to about 0.5-25 percent by weight as calculated on the amount of polymerizate or copolymerizate. Depending upon the degree of cross-linkage effected by the aforesaid reaction, the reaction product will swell to a higher or lower degree, or will be completely insoluble in organic solvents.

The products obtained by the herein described process are valuable plastics and elastomers which can be used with advantage for the most various fields of application, such as coatings, molded articles, electrical insulation.

The present invention is further illustrated by the following examples without being restricted thereto, the parts being by weight:

*Example 1*

10 parts of the methyl ether of the methylol compound of acrylamide are dissolved in 90 parts of water, 0.05 part of persulfate and 0.03 part of rongalite are added to the solution which is then heated to 30° C. with stirring. After 5 hours a highly viscous solution of the polymers has formed (K-value according to Fikentscher is equal to 150), which can be diluted with water at every proportion. By adding 0.5 part of concentrated H₂SO₄ and heating the solution to boiling temperature for 1 minute, a rigid gel is obtained.

Example 2

By dissolving 1 part of the methyl ether of the methylol compound of acrylamide and 9 parts of acrylamide in 90 parts of water and polymerizing the solution as described in Example 1, a viscous solution of the K-value 180 is obtained. By mixing the solution with 0.25 part of concentrated HCl and heating to boiling temperature for 3 minutes a gel is obtained which does not flow any longer.

Example 3

Into 100 parts of water, wherein 0.3 parts of persulfate and 0.05 parts of triethanol amine and 0.1 part of sodium bicarbonate are dissolved, a mixture of 9.5 parts of acrylonitrile and 0.5 parts of the methyl ether of the methylol compound of methacrylamide is introduced slowly at the rate the copolymer formed separates, the reaction temperature being adjusted to 28–30° C. by controlling the feeding velocity of the said mixture. The resulting copolymer, which separates in a yield of 100 percent, is diluted with suction, washed and carefully dried. The copolymer has a K-value of 102 and readily dissolves in dimethyl formamide. By treating the copolymer with H₂SO₄ or HCl with heating, a product is obtained which is insoluble in dimethyl formamide.

Example 4

5 parts of the sodium salt of the sulfonic acid of long-chain paraffines having 10–20 C atoms are dissolved in 150 parts of water, 0.35 parts of persulfate and 0.75 part of triethanolamine are added, and 60 parts of styrene, 40 parts of butyl acrylate and 10 parts of the methyl ether of the methylol compound of methacrylamide are emulsified in the solution. The emulsion, which has the pH-value 7.5, is polymerized at 25° C. for 10 hours with stirring. A latex is obtained which contains 42% of a copolymer.

By precipitating the copolymer by addition of alcohol, removing the electrolyte by intense washing with water and adding acetone or toluene, the polymer dissolves completely. The non cross-linked copolymer, repeatedly precipitated from acetone and toluene and washed with water, has a nitrogen content of 1%; this shows that the methylol methyl ether has been completely incorporated in the copolymer. By mixing the vitreous, slightly viscous latex with 0.5 part of lactic acid, pouring same on to a glass and drying at 70° C., a film is obtained which is completely insoluble in acetone and toluene.

What we claim is:

1. A process of producing an essentially linear polymer having etherified methylol groups which comprises polymerizing at temperatures not surpassing about 60° C. in a neutral to weakly alkaline medium, an ethylenically unsaturated organic compound containing the group of the formula:

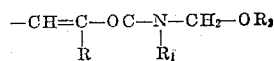

in which R stands for a member of the group consisting of hydrogen and methyl, R₁ stands for a member of the group consisting of hydrogen and alkyl, and R₂ stands for alkyl.

2. A process according to claim 1, wherein the polymerization is carried out in an aqueous medium.

3. A process of producing an essentially linear copolymer having etherified methylol groups which comprises polymerizing at temperatures not surpassing about 60° C. in a neutral to weakly alkaline medium (1) an ethylenically unsaturated organic compound containing the group of the formula:

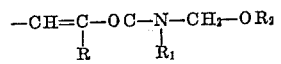

in which R stands for a member of the group consisting of hydrogen and methyl, R₁ stands for a member of the group consisting of hydrogen and alkyl, and R₂ stands for alkyl, and (2) a further compound copolymerizable therewith, and containing as sole reactive groups ethylene groups, said compound (1) being present in a quantity of 0.5 to 30 mol percent calculated on the amount of said further copolymerizable compound.

4. A process according to claim 3, wherein the polymerization is carried out in an aqueous medium.

5. A process for producing a high molecular weight cross linked product from a linear organic polymer of an ethylenically unsaturated compound of the formula:

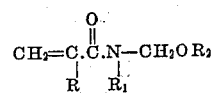

in which formula R stands for a member of the group consisting of hydrogen and methyl, R₁ stands for a member of the group consisting of hydrogen and alkyl and R₂ stands for alkyl, said process comprising reacting the aforesaid linear polymer under conditions which effect cleavage of the methylolether group, said conditions comprising heating the said polymer to a temperature of about 100–200° C. and recovering the resulting product.

6. A process for producing a high molecular weight cross-linked product from a linear organic polymer of an ethylenically unsaturated monomer of the formula:

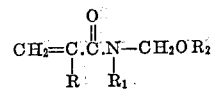

in which formula R stands for a member of the group consisting of hydrogen and methyl, R₁ stands for a member of the group consisting of hydrogen and alkyl, and R₂ stands for alkyl, said linear polymer being soluble in organic solvents, said process comprising reacting the aforesaid linear polymer under conditions which affect cleavage of the methylolether group, said conditions comprising subjecting said polymer to acids at a pH below 5.

7. A process for producing a high molecular weight cross-linked product from a linear organic polymer of an ethylenically unsaturated monomer of the formula:

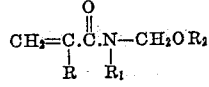

in which formula R stands for a member of the group consisting of hydrogen and methyl, R₁ stands for a member of the group consisting of hydrogen and alkyl, and R₂ stands for alkyl, said linear polymer being soluble in organic solvents, said process comprising reacting the aforesaid linear polymer under conditions which affect cleavage of the methylolether group, said conditions comprising subjecting the aforesaid linear polymer to react with compounds which are water-soluble condensates of aldehydes with at least one compound selected from the group consisting of phenols, ureas, dicyandiamides, and sulfonamides.

References Cited in the file of this patent

UNITED STATES PATENTS

| | | |
|---|---|---|
| 2,173,005 | Strain | Sept. 12, 1939 |
| 2,387,501 | Dietrich | Oct. 23, 1945 |
| 2,541,465 | Dickey | Feb. 13, 1951 |

OTHER REFERENCES

Schildknecht: "Vinyl and Related Polymers," page 321 (February 20, 1952), John Wiley and Sons, Inc., New York, publishers.